No. 820,553. PATENTED MAY 15, 1906.
N. E. CLEM.
PIE CRIMPER AND CRUST CUTTER.
APPLICATION FILED JULY 28, 1905.
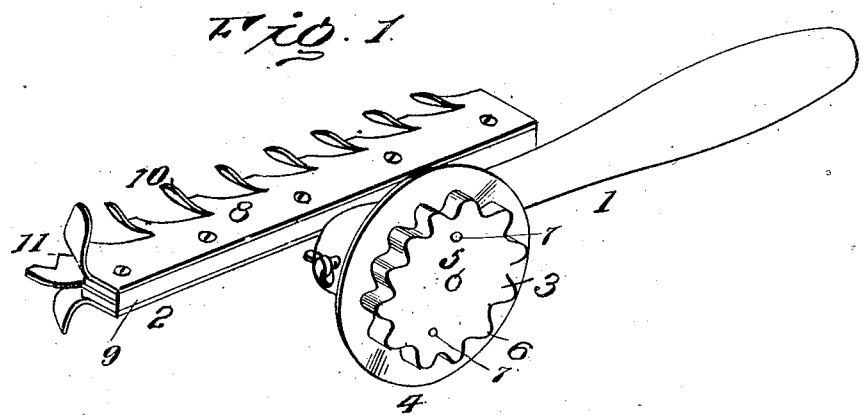
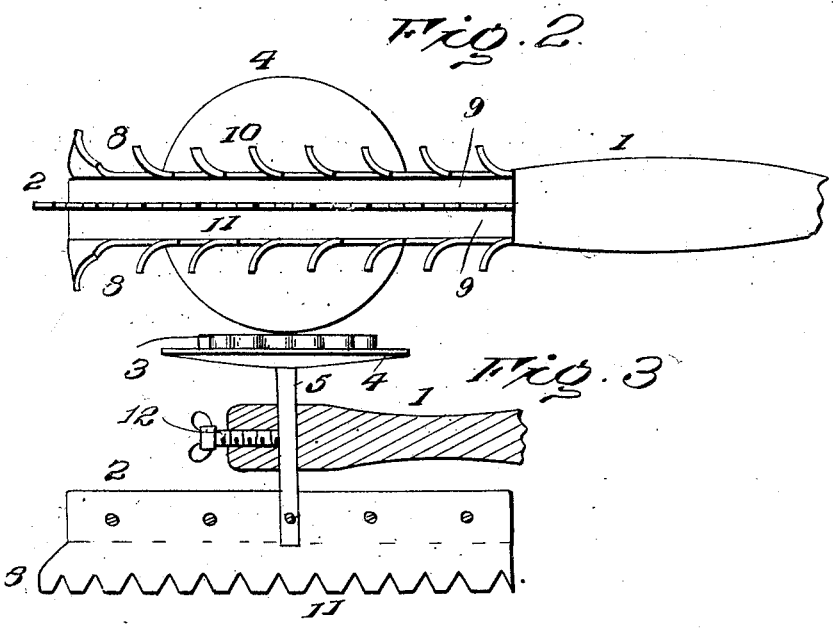
Witnesses
Inventor
N. E. Clem
By
Attorneys

UNITED STATES PATENT OFFICE.

NANCY E. CLEM, OF ENID, OKLAHOMA TERRITORY.

PIE-CRIMPER AND CRUST-CUTTER.

No. 820,553.     Specification of Letters Patent.     Patented May 15, 1906.

Application filed July 28, 1905. Serial No. 271,716.

*To all whom it may concern:*

Be it known that I, NANCY E. CLEM, a citizen of the United States, residing at Enid, in the county of Garfield, Territory of Oklahoma, have invented certain new and useful Improvements in Pie-Crimpers and Crust-Cutters, of which the following is a specification.

This invention consists of a novel culinary article designed for use in crimping and cutting pie-crust.

The device comprising the invention includes a suitable handle, an adjustable spindle upon said handle, said spindle carrying a cutter composed of a number of cutting-blades adapted to cut the central openings ordinarily provided in the upper layer of the pie-crust by one impression of the cutter thereon, the spindle also carrying a revolving crimping-disk and adjacent cutting-disk for crimping the crust of the pie and simultaneously cutting or trimming the crust at the edge of the pan as the said crust is crimped.

For a full description of the invention and the merits thereof and also to acquire a knowledge of the details of construction of the means for effecting the result reference is to be had to the following description and accompanying drawings, in which—

Figure 1 is a perspective view of a device embodying the invention. Fig. 2 is a side elevation showing more clearly the form of the stationary cutter. Fig. 3 is a vertical longitudinal sectional view through the handle, bringing out the adjusting means for the spindle carried thereby.

Corresponding and like parts are referred to in the following description and indicated in all the views of the drawings by the same reference characters.

Specifically describing the invention, the numeral 1 indicates the handle of the device, the numeral 2 the stationary cutter, the numeral 3 the crimping-disk, and the numeral 4 the cutting-disk. The handle 1 may be of any suitable shape to admit of conveniently grasping the same for manipulating the device, and arranged at one end of the handle, transversely thereof, is mounted the spindle 5, the latter projecting at its ends from the handle 1 in a manner readily apparent. Mounted for rotary movement upon one end of the spindle 5 is the crimping-disk 3 before mentioned, said crimping-disk being of solid form and having its peripheral portion formed with a plurality of lugs 6 to give the necessary crimped effect to the edge of the crust as the said disk is turned upon the edge of the pan when pressed against the crust. In order that the crust of the pie may be cut or trimmed at the edges of the pan simultaneously as the crimping operation is performed, it is preferred that the cutting-disk 4 be mounted upon the spindle 5 at the inner side of the disk 3, being preferably attached to the said disk 3 for rotation with the latter by means of fastenings, such as screws 7 or the like. The end of the spindle 5 opposite that carrying the members 3 and 4 supports the relatively stationary cutter 2 above mentioned, said cutter, however, being adjustable, so that it may be thrown to the right or left to admit of conveniently grasping the handle 1 when the device is used by right or left handed persons. The cutter 2 is composed of a number of cutting-plates 8, preferably three in number, as illustrated, the plates 8 being spaced from each other by means of interposed strips 9. The outermost of the plates 8 are provided with a plurality of cutting-blades 10, said blades being preferably formed by cutting the plates aforesaid from the outer edges thereof inwardly and then bending the cut portions outwardly. The blades 10 curve outwardly from the plates 8 carrying the same, so that they will form curved cuts preferably, the said curved cuts extending in opposite directions. The intermediate cutting-plate 8 is serrated at its outer edge to form a plurality of straight cutting-blades 11, the latter forming straight cuts in longitudinal alinement between the curved cuts which will be formed by the blades 10.

The operation of the invention will be readily seen. When the dough has been rolled preparatory to placing the same upon the pan to form the upper layer of crust, the cutter 2 is forced into the dough near the central portion thereof and the dough is cut in a number of places by the several blades 10 and 11 by one impression of the cutter. The dough after being placed upon the pan is crimped thereto by using the crimper 3 and is simultaneously cut or trimmed at the edges of the pan.

It will of course be understood that the cutter 2 is used to obviate the necessity for cutting the upper layer of pie-crust by using a knife and making a number of cuts after the dough has been folded upon itself—an operation which is commonly practiced by the housewife and which takes time and is not always satisfactory. In order that the spindle 5 may be adjusted so that the cutter 2 is inclined to the right or left, admitting of conveniently grasping the handle by right or left handed persons, the extremity of the handle near the spindle is provided with a longitudinal opening having a metallic bushing therein in which screws an adjusting-screw 12, and this screw may be engaged with the spindle to hold the cutter 2 adjusted in the above manner according to the desires of the user.

Having thus described the invention, what is claimed as new is—

1. In a device of the class described, the combination of a handle, a spindle mounted in the handle, rotary crimping and cutting disks carried by one end of the spindle, and a stationary cutter composed of a plurality of blades mounted upon the opposite end of the spindle.

2. In a device of the class described, the combination of a handle, a spindle mounted in the handle, rotary crimping and cutting disks carried by one end of the spindle, a stationary cutter composed of a plurality of blades mounted upon the opposite end of the spindle, and means for adjusting the stationary cutter.

3. In a device of the class described, the combination of a handle, a spindle mounted in the handle, rotary crimping and cutting disks carried by one end of the spindle, and a stationary cutter composed of a plurality of blades extending in opposite directions and mounted upon the opposite end of the spindle.

4. In a device of the class described, the combination of a handle, a spindle mounted in the handle, rotary crimping and cutting disks carried by one end of the spindle, a stationary cutter composed of a plurality of blades extending in opposite directions and mounted upon the opposite end of the spindle, and a set-screw carried by the handle and adapted to engage the spindle to hold the stationary cutter at a predetermined adjustment.

In testimony whereof I affix my signature in presence of two witnesses.

NANCY E. CLEM. [L. S.]

Witnesses:
AL. HUSCH,
FRANK MANNING.